United States Patent
Carey et al.

(10) Patent No.: US 8,123,650 B2
(45) Date of Patent: *Feb. 28, 2012

(54) MULTI-SPEED TRANSAXLE FOR A FRONT WHEEL DRIVE VEHICLE

(75) Inventors: Clinton E. Carey, Highland, MI (US); Scott H. Wittkopp, Ypsilanti, MI (US); James M. Hart, Belleville, MI (US); Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 628 days.

This patent is subject to a terminal disclaimer.

(21) Appl. No.: 12/274,143

(22) Filed: Nov. 19, 2008

(65) Prior Publication Data

US 2009/0209390 A1 Aug. 20, 2009

Related U.S. Application Data

(60) Provisional application No. 61/030,106, filed on Feb. 20, 2008.

(51) Int. Cl.
*F16H 3/44* (2006.01)

(52) U.S. Cl. .................................... 475/282; 475/288
(58) Field of Classification Search .......... 475/275–291, 475/296, 330
See application file for complete search history.

(56) References Cited

U.S. PATENT DOCUMENTS

| | | | | |
|---|---|---|---|---|
| 5,605,517 A | * | 2/1997 | Sherman | 475/276 |
| 5,707,312 A | * | 1/1998 | Sefcik | 475/275 |
| 6,547,688 B2 | * | 4/2003 | Takagi et al. | 475/276 |
| 6,913,556 B2 | * | 7/2005 | Armstrong et al. | 475/269 |
| 7,699,741 B2 | * | 4/2010 | Hart et al. | 475/271 |
| 7,775,931 B2 | * | 8/2010 | Carey et al. | 475/276 |
| 2009/0264240 A1 | * | 10/2009 | Carey et al. | 475/205 |
| 2009/0305838 A1 | * | 12/2009 | Borgerson et al. | 475/276 |

* cited by examiner

*Primary Examiner* — Roger Pang

(57) ABSTRACT

A front wheel drive transmission is provided having an input member, an output member, four planetary gear sets, a plurality of coupling members and a plurality of torque transmitting devices. Each of the planetary gear sets includes a sun gear member, a planet carrier member, and a ring gear member. The torque transmitting devices include clutches and brakes arranged within a transmission housing.

17 Claims, 2 Drawing Sheets

Figures 1A, 1B:
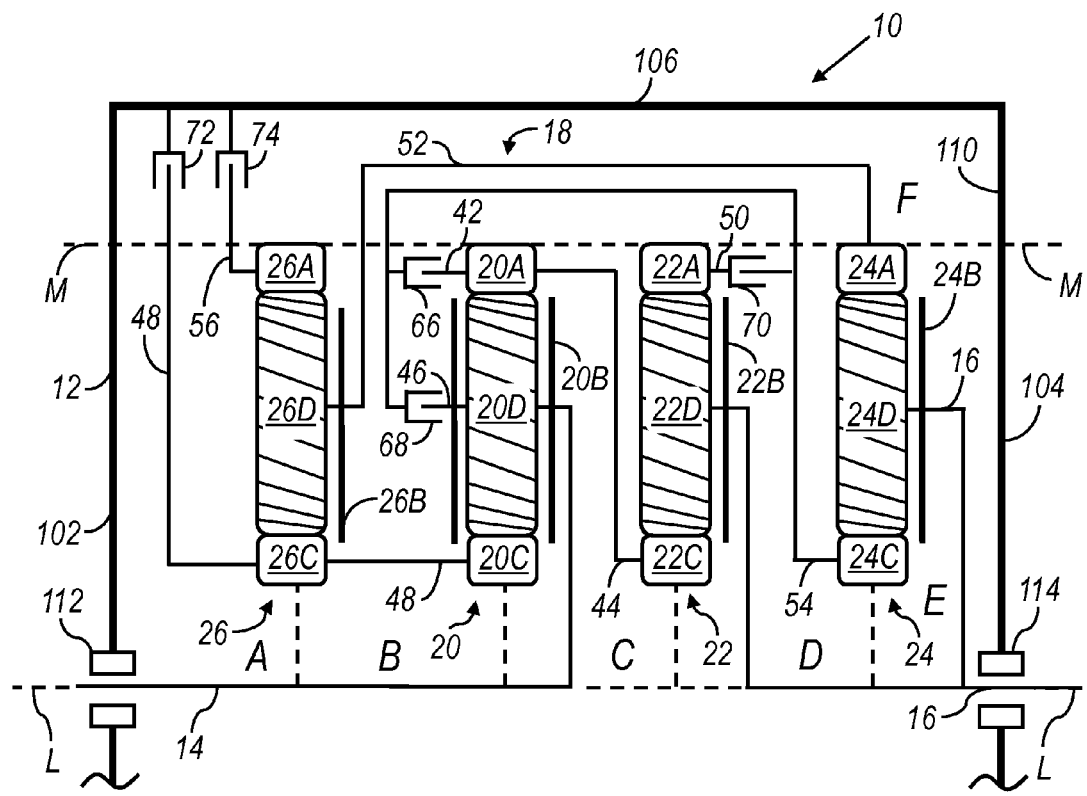

| Clutch | Zone Location | | | | | |
|---|---|---|---|---|---|---|
| | A | B | C | D | E | F |
| 72 | X | | | | X | X |
| 74 | X | | | | X | X |
| 68 | | X | | | | X |
| 66 | | X | X | | | X |
| 70 | | | X | X | | X |

MULTI-SPEED TRANSAXLE FOR A FRONT WHEEL DRIVE VEHICLE

CROSS-REFERENCE TO RELATED APPLICATIONS

This application claims the benefit of U.S. Provisional Application No. 61/030,106, filed on Feb. 20, 2008, which is hereby incorporated in its entirety herein by reference.

FIELD

The invention relates generally to a multiple speed transmission having a plurality of planetary gear sets and a plurality of torque transmitting devices and more particularly to a transmission configured for a front wheel drive vehicle having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

In one aspect of the present invention, a transaxle is provided having a transmission input member, a transmission output member, a plurality of planetary gear sets, and a plurality of torque-transmitting mechanisms.

In another aspect of the present invention, a housing having a first wall, a second wall and a third wall extending between the first and second walls is provided. The first, second, third and fourth planetary gear sets are disposed within the housing. The fourth planetary gear set is adjacent the first wall, the third planetary gear set is adjacent second wall, the first planetary gear set is adjacent the fourth planetary gear set and the second planetary gear set is between the first and third planetary gear sets.

In yet another aspect of the present invention, each planetary gear set has a sun gear member, a ring gear member, and a planet carrier member supporting a plurality of planet gears each configured to intermesh with both the sun gear member and the ring gear member. The ring gear member of the first planetary gear set is permanently coupled to the sun gear member of the second planetary gear set, the sun gear member of the first planetary gear set is permanently coupled to the sun gear member of the fourth planetary gear set, the ring gear member of the third planetary gear set is permanently coupled to the planet carrier member of the fourth planetary gear set.

In yet another aspect of the present invention, the output member is permanently coupled with the carrier members of the second and third planetary gear sets. The input member is permanently coupled with the carrier member of the first planetary gear set.

In yet another aspect of the present invention, the housing has a first area defined radially inward from an outer periphery of the planetary gear sets and axially bounded by the first wall and the fourth planetary gear set. A second area is defined radially inward from the outer periphery of the planetary gear sets and axially bounded by the first and fourth planetary gear sets. A third area is defined radially inward from the outer periphery of the planetary gear sets and axially bounded by the first and second planetary gear sets. A fourth area is defined radially inward from the outer periphery of the planetary gear sets and axially bounded by the second and third planetary gear set. A fifth area is defined radially inward from the outer periphery of the planetary gear sets and axially bounded by the third planetary gear set and the second wall. A sixth area is defined radially inward from the third wall and radially outward from the outer periphery of the planetary gear sets and axially bounded by the first wall and the second wall.

In yet another aspect of the present invention, the first clutch is disposed in at least one of the second, third and sixth areas and is selectively engageable to interconnect the ring gear member of the first planetary gear set with the sun gear member of the third planetary gear set.

In yet another aspect of the present invention, a second clutch is disposed in at least one of the second and sixth areas and is selectively engageable to interconnect the planet carrier member of the first planetary gear set with the sun gear member of the third planetary gear set.

In yet another aspect of the present invention, a third clutch is disposed in at least one of the third, fourth and sixth areas and is selectively engageable to interconnect the ring gear member of the second planetary gear set with the sun gear member of the third planetary gear set.

In yet another aspect of the present invention, a first brake is disposed in at least one of the first, fifth and sixth areas and is selectively engageable to interconnect the sun gear member of the first planetary gear set and the sun gear member of the fourth planetary gear set to the housing.

In yet another aspect of the present invention, a second brake is disposed in at least one of the first, fifth and sixth areas and is selectively engageable to interconnect the ring gear member of the fourth planetary gear set to the housing.

In still another aspect of the present invention, the clutches and the brakes are selectively engageable to establish at least eight forward speed ratios and at least one reverse speed ratio between the transmission input member and the transmission output member.

In still another aspect of the present invention, a power transfer assembly has a first and a second transfer gear and a power transfer member. The first transfer gear is rotatably fixed to the engine output member and the second transfer gear is rotatably fixed to the transmission input member. The power transfer member is rotatably coupled to the first and second transfer gears for transferring rotational energy from the first transfer gear to the second transfer gear.

In still another aspect of the present invention, a final drive planetary gear set has a final drive sun gear coupled to the transmission output member, a final drive ring gear coupled to the transmission housing and a final drive carrier member rotatably supporting a final drive plurality of pinion gears intermeshed with both the final drive sun gear and the final drive ring gear.

In still another aspect of the present invention, a differential gear set having a differential housing coupled to the final drive carrier member and has a pair of gears rotatably supported in the differential housing. One of the pair of the gears is rotatably fixed to one of a pair of road wheels and the other of the pair of the gears is rotatably fixed to the other one of the pair of road wheels.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
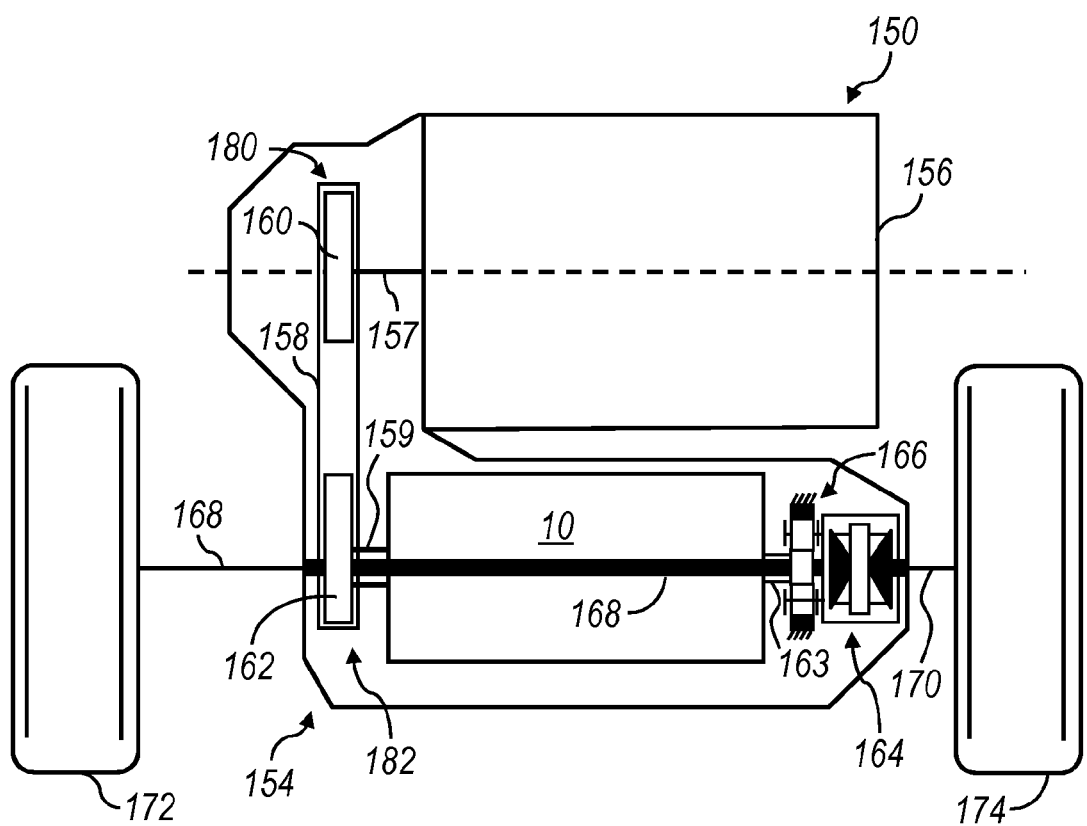

FIG. 1A is a schematic diagram of a gear arrangement for a front wheel drive transmission, according to the principles of the present invention;

FIG. 1B is a chart showing the locations of the torque transmitting devices for the arrangement of planetary gear sets of the transmission shown in FIG. 1A, in accordance with the embodiments of the present invention; and FIG. 2 is a schematic diagram of a front wheel drive transaxle arrangement incorporating the gear arrangement of the transmission of FIG. 1A and FIG. 1B, according to the principles of the present invention.

DETAILED DESCRIPTION

The following description is merely exemplary in nature and is not intended to limit the present disclosure, application, or uses.

Referring now to FIG. 1A, an embodiment of a front wheel drive multi-speed or eight speed transmission is generally indicated by reference number 10. The transmission 10 is illustrated as a front wheel drive or transverse transmission, though various other types of transmission configurations may be employed. The transmission 10 includes a transmission housing 12, an input shaft or member 14, an output shaft or member 16 and a gear arrangement 18. The input member 14 is continuously connected to an engine (shown in FIG. 2) or to a turbine of a torque converter (not shown). The output member 16 is continuously connected with a final drive unit (not shown) or transfer case (shown in FIG. 2).

The gear arrangement 18 of transmission 10 includes a first planetary gear set 20, a second planetary gear set 22, a third planetary gear set 24, and a fourth planetary gear set 26. The planetary gear sets 20, 22, 24 and 26 are connected between the input member 14 and the output member 16.

In a preferred embodiment of the present invention, the planetary gear set 20 includes a ring gear member 20A, a planet carrier member 20B that rotatably supports a set of planet or pinion gears 20D (only one of which is shown) and a sun gear member 20C. The ring gear member 20A is connected for common rotation with a first shaft or intermediate member 42 and a second shaft or intermediate member 44. The planet carrier member 20B is connected for common rotation with input shaft or member 14 and a third shaft or intermediate member 46. The sun gear member 20C is connected for common rotation with a fourth shaft or intermediate member 48. The pinion gears 20D are each configured to intermesh with both the sun gear member 20C and the ring gear member 20A.

The planetary gear set 22 includes a ring gear member 22A, a planet carrier member 22B that rotatably supports a set of planet or pinion gears 22D and a sun gear member 22C. The ring gear member 22A is connected for common rotation with a fifth shaft or intermediate member 50. The planet carrier member 22B is connected for common rotation with the output shaft or member 16. The sun gear member 22C is connected for common rotation with the second shaft or intermediate member 44. The pinion gears 22D are each configured to intermesh with both the sun gear member 22C and the ring gear member 22A.

The planetary gear set 24 includes a ring gear member 24A, a planet carrier member 24B that rotatably supports a set of planet or pinion gears 24D and a sun gear member 24C. The ring gear member 24A is connected for common rotation with a sixth shaft or intermediate member 52. The planet carrier member 24B is connected for common rotation with the output shaft or member 16. The sun gear member 24C is connected for common rotation with the seventh shaft or intermediate member 54. The pinion gears 24D are each configured to intermesh with both the sun gear member 24C and the ring gear member 24A.

The planetary gear set 26 includes a ring gear member 26A, a carrier member 26B that rotatably supports a set of planet or pinion gears 26D and a sun gear member 26C. The ring gear member 26A is connected for common rotation with an eighth shaft or intermediate member 56. The planet carrier member 26B is connected for common rotation with the sixth shaft or intermediate member 52. The sun gear member 26C is connected for common rotation with the fourth shaft or intermediate member 48. The pinion gears 26D are each configured to intermesh with both the sun gear member 26C and the ring gear member 26A.

The transmission 10 also includes a plurality of torque-transmitting mechanisms or devices including a first clutch 66, a second clutch 68, a third clutch 70, a first brake 72 and a second brake 74. The first clutch 66 is selectively engageable to connect the first shaft or intermediate member 42 to the seventh shaft or intermediate member 54. The second clutch 68 is selectively engageable to connect the third shaft or intermediate member 46 to the seventh shaft or intermediate member 54. The third clutch 70 is selectively engageable to connect the fifth member or intermediate member 50 to the seventh shaft or intermediate member 54. The first brake 72 is selectively engageable to connect the fourth shaft or intermediate member 48 to the transmission housing 12 to restrict rotation of the member 48 relative to the transmission housing 12. Finally, the second brake 74 is selectively engageable to connect the eighth shaft or intermediate member 56 to the transmission housing 12 to restrict rotation of the member 56 relative to the transmission housing 12.

The transmission 10 is capable of transmitting torque from the input shaft or member 14 to the output shaft or member 16 in at least eight forward torque ratios and one reverse torque ratio. Each of the forward torque ratios and the reverse torque ratio are attained by engagement of one or more of the torque-transmitting mechanisms (i.e. first clutch 66, second clutch 68, third clutch 70, first brake 72 and second brake 74). Those skilled in the art will readily understand that a different speed ratio is associated with each torque ratio. Thus, eight forward speed ratios may be attained by the transmission 10.

The transmission housing 12 includes a first wall or structural member 102, a second wall or structural member 104 and a third wall or structural member 106. The third wall 106 interconnects the first and second walls 102 and 104 to define a space or cavity 110. Input shaft or member 14 is supported by the first wall 102 by bearings 112. Output shaft or member 16 is supported by the second wall 104 by bearings 114. The planetary gear sets 20, 22, 24 and 26 and the torque-transmitting mechanisms 66, 68, 70, 72 and 74 are disposed within cavity 110. Further, cavity 110 has a plurality of areas or zones A, B, C, D, E, and F in which the plurality of torque transmitting mechanisms 66, 68, 70, 72 and 74 will be specifically positioned or mounted, in accordance with the preferred embodiments of the present invention.

As shown in FIG. 1A, zone A is defined by the area or space bounded by: the first wall 102, planetary gear set 26, radially inward by a reference line "L" which is a longitudinal line that is axially aligned with the input shaft 14, and radially outward by a reference line "M" which is a longitudinal line that extends adjacent an outer diameter or outer periphery of the planetary gear sets 20, 22, 24 and 26. While reference line "M" is illustrated as a straight line throughout the several views, it should be appreciated that reference line "M" follows the outer periphery of the planetary gear sets 20, 22, 24 and 26, and accordingly may be stepped or non-linear depending on the location of the outer periphery of each of the planetary gear sets 20, 22, 24 and 26. Zone B is defined by the area bounded by: planetary gear set 26, the planetary gear set 20, radially outward by reference line "M", and radially inward by reference line "L". Zone C is defined by the area bounded by: the planetary gear set 20, the planetary gear set 22, radially outward by reference line "M", and radially inward by reference line "L". Zone D is defined by the area bounded by: the planetary gear set 22, the planetary gear set 24, radially outward by reference line "M", and radially inward by reference line "L". Zone E is defined by the area bounded by: the planetary gear set 24, the second end wall 104, radially outward by reference line "M", and radially inward by reference line "L". Zone F is defined by the area bounded by: the first wall 102, the second wall 104, radially inward by reference line "M" and radially outward by the third wall 106.

In the gear arrangement 18 of transmission 10 shown in FIG. 1A, the planetary gear set 26 is disposed closest to the first wall 102, the planetary gear set 24 is disposed closest to the second wall 104, the planetary gear set 20 is disposed adjacent the planetary gear set 26, and the planetary gear set 22 is disposed between the planetary gear sets 20 and 24. The torque-transmitting mechanisms are intentionally located within specific Zones in order to provide advantages in overall transmission size, packaging efficiency, and reduced manufacturing complexity. In the particular example shown in FIG. 1A, the first and second clutches 66 and 68 are disposed within Zone B, the third clutch 70 is disposed within Zone D, the first brake 72 and the second brake 74 are disposed within Zone F.

However, the present invention contemplates other embodiments where the torque-transmitting mechanisms 66, 68, 70, 72 and 74 are disposed in the other Zones. The feasible locations of the torque-transmitting mechanisms 66, 68, 70, 72 and 74 within the Zones are illustrated in the chart shown in FIG. 1B. The chart of FIG. 1B lists clutches and brakes in the left most column and the available zones to locate the clutch/brake in the top row. An "X" in the chart indicates that the present invention contemplates locating the clutch or brake in the zone listed in the top row. For example, first brake 72 may be located in zones A, E or F and second brake 74 may be located in zones A, E or F.

Referring now to FIG. 2, a front wheel drive powertrain 150 incorporating a transaxle 154 is illustrated, in accordance with the embodiments of the present invention. Transaxle 154 includes the transmission 10 having the gear arrangement 18 of FIGS. 1A and 1B. Transaxle 154 is mounted to an engine 156. Engine 156 produces a driving torque in an engine output shaft 157 that drives the input shaft 14 of transmission 10, as described below. Engine 156 is generally an internal combustion engine, however, the present invention contemplates other types of engines such as electric and hybrid engines. Further, transaxle 154 includes a transfer chain or belt 158, a drive sprocket or gear 160, a driven sprocket or gear 162, a differential 164, a final drive planetary gear set 166 and a pair of drive axles 168 and 170 that drive a pair of road wheels 172 and 174, respectively.

Transfer chain or belt 158 engages at a first end 180 drive sprocket or gear 160 and at a second end 182 the driven sprocket or gear 162. The drive sprocket or gear 160 is coupled to engine output shaft or member 157. Driven sprocket 162 is rotatably fixed to a drive shaft or rotatable member 159. Drive shaft or rotatable member 159 is coupled to the input shaft 14 of transmission 10. The output shaft 16 of transmission 10 is connected to an output sleeve shaft 163. Output sleeve shaft 163 is coupled to a sun gear of a final drive planetary gear set 166 to achieve the desired gear ratio. A carrier member of final drive planetary gear set 166 supports a plurality of pinion gears which mesh with both the sun gear and a ring gear of final drive planetary gear set 166. The carrier member of final drive planetary gear set 166 is rotatably coupled to and transfers driving torque to a housing of the differential 164. Differential 164 transfers the driving torque generated by engine 156 to the two drive axles 168 and 170 through two sets of bevel gears rotationally supported in the differential housing. Drive axles 168 and 170 are rotatably fixed to and independently driven by the bevel gears of the differential 164 to supply the driving torque to the vehicle road wheels 172 and 174.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transaxle coupled to an engine output member, the transaxle comprising:
   a transmission input member;
   a transmission output member;
   a housing having a first wall, a second wall, and a third wall extending between the first and second walls;
   a first, second, third and fourth planetary gear sets disposed within the housing, wherein the fourth planetary gear set is adjacent the first wall, the third planetary gear set is adjacent second wall, the first planetary gear set is adjacent the fourth planetary gear set and the second planetary gear set is between the first and third planetary gear sets, each planetary gear set having a sun gear member, a ring gear member, and a planet carrier member supporting a plurality of planet gears each configured to intermesh with both the sun gear member and the ring gear member, and wherein the ring gear member of the first planetary gear set is permanently coupled to the sun gear member of the second planetary gear set, the sun gear member of the first planetary gear set is permanently coupled to the sun gear member of the fourth planetary gear set, the ring gear member of the third planetary gear set is permanently coupled to the planet carrier member of the fourth planetary gear set, the output member is permanently coupled with the carrier members of the second and third planetary gear sets and the put member is permanently coupled with the carrier member of the first planetary gear set, and
   wherein the housing has a first area defined radially inward from an outer periphery of the planetary gear sets and axially bounded by the first wall and the fourth planetary gear set, a second area defined radially inward from the outer periphery of the planetary gear sets and axially bounded by the first and fourth planetary gear sets, a third area defined radially inward from the outer periphery of the planetary gear sets and axially bounded by the first and second planetary gear sets, a fourth area defined radially inward from the outer periphery of the planetary gear sets and axially bounded by the second and third planetary gear set, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall;

a first clutch disposed in at least one of the second, third and sixth areas;

a second clutch disposed in at least one of the second and sixth areas;

a third clutch disposed in at least one of the third, fourth and sixth areas;

a first brake disposed in at least one of the first, fifth and sixth areas;

a second brake disposed in at least one of the first, fifth and sixth areas, and wherein the clutches and the brakes are selectively engageable to establish at least eight forward speed ratios and at least one reverse speed ratio between the transmission input member and the transmission output member, and a power transfer assembly having a first and a second transfer gear and a power transfer member, wherein the first transfer gear is rotatably fixed to the engine output member and the second transfer gear is rotatably fixed to the transmission input member and wherein the power transfer member rotatably couples the first and second transfer gears for transferring rotational energy from the first transfer gear to the second transfer gear;

a final drive planetary gear set having a final drive first member coupled to the transmission output member, a final drive second member coupled to the transmission housing and a final drive third member; and a differential gear set having a differential housing coupled to the final drive third member and having a pair of gears rotatably supported in the differential housing, wherein one of the pair of the gears is rotatably fixed to one of a pair of road wheels and the other of the pair of the gears is rotatably fixed to the other one of the pair of road wheels.

2. The transaxle of claim 1 wherein the first clutch is selectively engageable to interconnect at least one of the ring gear member of the first planetary gear set and the sun gear member of the second planetary gear set with the sun gear member of the third planetary gear set and is disposed in the second area, the second clutch is disposed in the second area, the third clutch is disposed in the fourth area, the first brake is disposed in the sixth area and the second brake is disposed in the sixth area.

3. The transaxle of claim 1 wherein the first clutch is disposed within the third area.

4. The transaxle of claim 1 wherein the first clutch is disposed within the sixth area.

5. The transaxle of claim 1 wherein the second clutch is selectively engageable to interconnect the planet carrier member of the first planetary gear set with the sun gear member of the third planetary gear set and wherein the second clutch is disposed within the second area.

6. The transaxle of claim 1 wherein the second clutch is disposed within the sixth area.

7. The transaxle of claim 1 wherein the third clutch is selectively engageable to interconnect the ring gear member of the second planetary gear set with the sun gear member of the third planetary gear set and wherein the third clutch is disposed within the fourth area.

8. The transaxle of claim 1 wherein the third clutch is disposed within the third area.

9. The transaxle of claim 1 wherein the third clutch is disposed within the sixth area.

10. The transaxle of claim 1 wherein the first brake is selectively engageable to interconnect the sun gear member of the first planetary gear set and the sun gear member of the fourth planetary gear set to the housing and wherein the first brake is disposed within the sixth area.

11. The transaxle of claim 1 wherein the first brake is disposed within the fifth area.

12. The transaxle of claim 1 wherein the first brake is disposed within the first area.

13. The transaxle of claim 1 wherein the second brake is selectively engageable to interconnect the ring gear member of the fourth planetary gear set to the housing and wherein the second brake is disposed within the sixth area.

14. The transaxle of claim 1 wherein the second brake is disposed within the fifth area.

15. The transaxle of claim 1 wherein the second brake is disposed within the first area.

16. A transaxle coupled to an engine output member, the transaxle comprising:

a transmission input member;

a transmission output member;

a housing having a first wall, a second wall, and a third wall extending between the first and second walls;

a first, second, third and fourth planetary gear sets disposed within the housing, wherein the fourth planetary gear set is adjacent the first wall, the third planetary gear set is adjacent second wall, the first planetary gear set is adjacent the fourth planetary gear set and the second planetary gear set is between the first and third planetary gear sets, each planetary gear set having a sun gear member, a ring gear member, and a planet carrier member supporting a plurality of planet gears each configured to intermesh with both the sun gear member and the ring gear member, and wherein the ring gear member of the first planetary gear set is permanently coupled to the sun gear member of the second planetary gear set, the sun gear member of the first planetary gear set is permanently coupled to the sun gear member of the fourth planetary gear set, the ring gear member of the third planetary gear set is permanently coupled to the planet carrier member of the fourth planetary gear set, the output member is permanently coupled with the carrier members of the second and third planetary gear sets and the input member is permanently coupled with the carrier member of the first planetary gear set, and wherein the housing has a first area defined radially inward from an outer periphery of the planetary gear sets and axially bounded by the first wall and the fourth planetary gear set, a second area defined radially inward from the outer periphery of the planetary gear sets and axially bounded by the first and fourth planetary gear sets, a third area defined radially inward from the outer periphery of the planetary gear sets and axially bounded by the first and second planetary gear sets, a fourth area defined radially inward from the outer periphery of the planetary gear sets and axially bounded by the second and third planetary gear set, a fifth area defined radially inward from the outer periphery of the planetary gear sets and axially bounded by the third planetary gear set and the second wall, and a sixth area defined radially inward from the third wall and radially outward from the outer periphery of the planetary gear sets and axially bounded by the first wall and the second wall;

a first clutch disposed in at least one of the second, third and sixth areas and is selectively engageable to interconnect the ring gear member of the first planetary gear set with the sun gear member of the third planetary gear set;

a second clutch disposed in at least one of the second and sixth areas and is selectively engageable to interconnect the planet carrier member of the first planetary gear set with the sun gear member of the third planetary gear set;

a third clutch disposed in at least one of the third, fourth and sixth areas is selectively engageable to interconnect the ring gear member of the second planetary gear set with the sun gear member of the third planetary gear set;

a first brake disposed in at least one of the first, fifth and sixth areas and is selectively engageable to interconnect the sun gear member of the first planetary gear set and the sun gear member of the fourth planetary gear set to the housing;

a second brake disposed in at least one of the first, fifth and sixth areas and is selectively engageable to interconnect the ring gear member of the fourth planetary gear set to the housing, and wherein the clutches and the brakes are selectively engageable to establish at least eight forward speed ratios and at least one reverse speed ratio between the transmission input member and the transmission output member, and a power transfer assembly having a first and a second transfer gear and a power transfer member, wherein the first transfer gear is rotatably fixed to the engine output member and the second transfer gear is rotatably fixed to the transmission input member and wherein the power transfer member rotatably couples the first and second transfer gears for transferring rotational energy from the first transfer gear to the second transfer gear;

a final drive planetary gear set having a final drive sun gear coupled to the transmission output member, a final drive ring gear coupled to the transmission housing and a final drive carrier member rotatably supporting a final drive plurality of pinion gears intermeshed with both the final drive sun gear and the final drive ring gear; and a differential gear set having a differential housing coupled to the final drive carrier member and having a pair of gears rotatably supported in the differential housing, wherein one of the pair of the gears is rotatably fixed to one of a pair of road wheels and the other of the pair of the gears is rotatably fixed to the other one of the pair of road wheels.

17. The transaxle of claim 16, wherein the power transfer member is a chain or a belt.

* * * * *